United States Patent Office 2,962,613
Patented Nov. 29, 1960

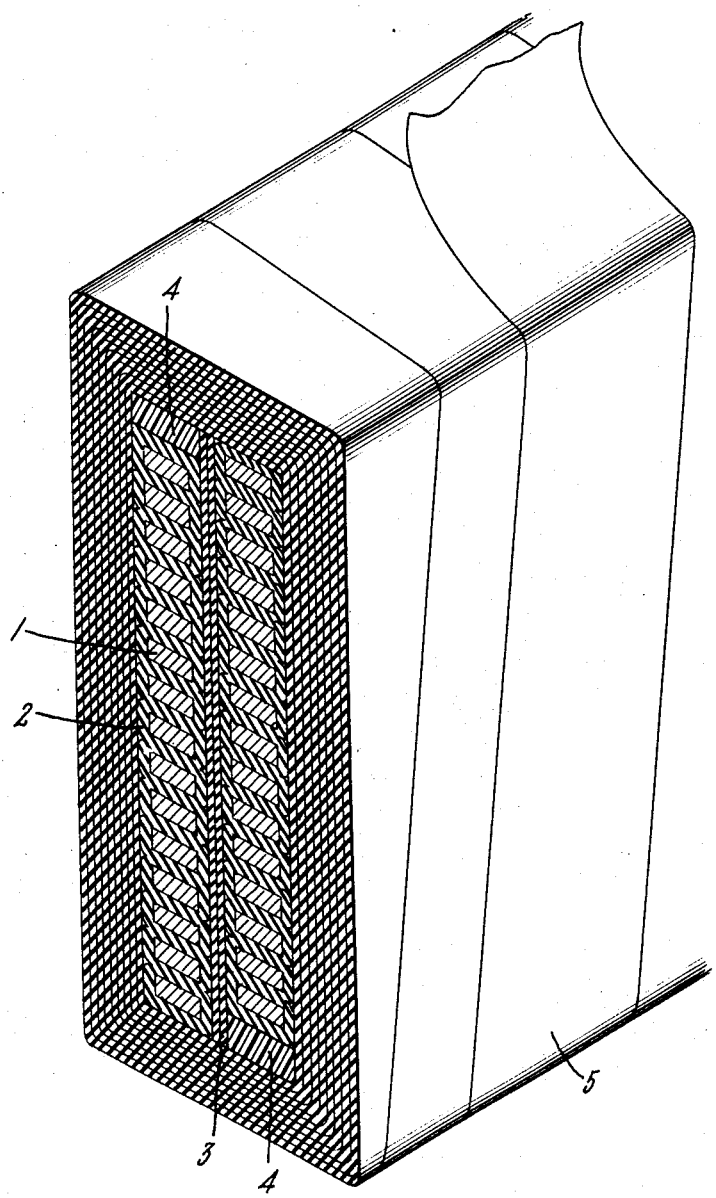

2,962,613

INSULATION SYSTEM

Richard T. Maher, Wilton, and Kevork A. Torossian, Ballston Lake, N.Y., assignors to General Electric Company, a corporation of New York Filed June 23, 1958, Ser. No. 743,691

2 Claims. (Cl. 310—208)

This invention relates to new and useful insulating systems. More particularly, it relates to new insulating systems for electrical conductors, and particularly for electrodynamic machine windings which are characterized by improved high-temperature characteristics.

Windings for electrodynamic machines are generally constructed of a plurality of conductor turns or strands insulated one from the other and having a surrounding or outer ground insulation around the assembled strands. In alternating-current machines, the individual conductors or strands after coating with an insulating material are placed together in transposed fashion with an insulating separator between each stack of conductors. When transposing the conductors to reduce skin effect, as is taught, for example by Roebel the voids left in the bar periphery are typically filled by shellac or asphalt impregnated fibrous materials. However, the wedge shaped material does not completely fill these voids. The interconductor insulation is also often an asphaltic material used in conjunction with a fibrous material such as glass or asbestos. Separator strips used to separate the tiers of conductors or strands are normally made of glass-asbestos or similar materials bonded with a resin. The outer ground insulation can be of many forms. One preferred form of such insulation is one made up in part or in whole of mica mat or mica paper. Mica mat or paper is a paper or cardboard like material which is made by splitting micaceous material into tiny flakes or platelets which are then laid down in paper-making fashion to form a mica sheet material or paper. The preparation of such mica paper is described, for example, in Patents 2,549,880; 2,614,055 and 2,709,158, which are by reference made a part of this application. This mica paper can be used alone or preferably in conjunction with mica flake tape which tends to hold it in place. The ground insulation is coated and impregnated with a thermosetting material such as epoxy resin or a polyesterepoxy resin combination, such as that described in Patent 2,707,204 assigned to the same assignee as this invention. The ground insulation is during fabrication wrapped with a sacrifice tape such as of a suitable resinous material, placed in a tank, and treated under vacuum to withdraw volatile material and solvent from the assembly. Molten asphalt, other bitumen-like or other fluid pressure transmitting material is then run into the tank under pressure at elevated temperature to cover the wrapped bar and cure the ground insulation and strand insulation and bond the various components into a unitary system. The bar is then removed from the tank and the sacrifice tape stripped away. This procedure is repeated as necessary until the desired ground insulation buildup is completed.

While the ground insulation comprising mica paper, or other usual ground insulation, is itself a very efficient form of insulation, when impregnated with thermosetting resins, conductor bars insulated therewith, in which typical asphalt based or polyester resins or other excessive gas producing material is used for the internal bar insulation, or in any part of the composite insulation, such as transposition wedges and the like, are characterized under high temperature conditions of the order of 120° C. by poor bond strength and gassing with the resultant appearance of voids or delamination within the ground insulation, or separation of the ground insulation from the conductor bar array itself, as well as girth cracks in the winding. Such defects, of course, in creating voids make the winding and machine subject to corona and early failure. As electrodynamic machines increase in rating, there is a corresponding rise in temperature which aggravates this condition. Other types of ground insulation act in a similar manner.

A principal object of this invention is to provide an insulation system for electrical windings having insulation which is capable of operating at elevated temperatures without delaminating the creation of voids within the insulation.

Another object is to provide an internal insulation system for conductor bar arrays which is essentially non-gassing at elevated temperatures.

Biefly stated, our invention comprises an insulating system for electrical windings in which the entire internal conductor bar insulation has as its resinous component an epoxy resin combination which is characterized by an extremely low tendency to volatilize or produce volatile materials even at elevated temperatures.

The features of our invention which we believe to be novel are set forth with particularity in the claims appended hereto. Our invention itself, however, both as to its organization and method of operation, together with further objectives and advantages thereof, may best be understood from a consideration of the following description and the drawing, in which the single figure is a partial perspective view, partially in cross-section, of a finished winding made according to our invention.

Referring to the drawing, there is shown at 1 a perspective view, partially in cross-section, of a winding including the insulation system of this invention. The winding is made up of a plurality of conductor bars or straps 1 surrounded by a so-called strand insulation 2, the tiers of insulated conductors being separated by vertical separators 3. Shown at 4 are the spaces left by the Roebel transposition, these spaces being filled by a putty. The entire conductor bar or array is surrounded by a ground insulation 5 comprising alternate or otherwise arranged layers of mica paper and mica flake tape.

As pointed out above, the present insulation system has as its resinous component epoxy resin compositions of peculiar characteristics. The epoxy resins used in conjunction with my invention are, as pointed out above, well known in the art. They are described in Castan U.S. Patent Nos. 2,324,483 and 2,444,333, British Patent No. 518,057 and British Patent No. 579,698. Generally, the ethoxyline resins described therein are the reaction product of an epihalogenohydrin such as epichlorohydrin and a phenol having at least two phenolic hydroxy groups such as bis-(4-hydroxy phenyl)-2,2 propane. U.S. Patent Nos. 2,494,295; 2,500,600 and 2,511,913 describe further ethoxyline resins which can be used in conjunction with our invention. The above patents are hereby incorporated by reference in this application. The ethoxyline resins used herein have more than one epoxy group per molecule. They can generally be prepared by reacting a polyhydroxy alcohol or phenol such as hydroquinone, resorcinol, glycerine and condensation products of phenols with ketones, for example bis-(4-hydroxy phenyl)-2,2-propane with epichlorohydrin. The reaction of epichlorohydrin with bis-(4-hydroxy phenyl)-2,2-propane is as follows:

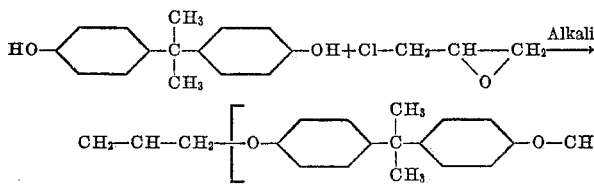
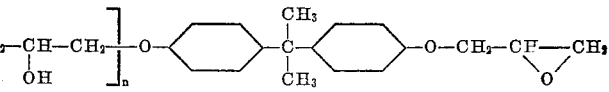

where $n$ has an average value ranging from 0 to about 7. Such ethoxyline resins are sold under the name of Epon by Shell Chemical Corporation, under the name Araldite by the Ciba Company, as Epi-Rez by Devoe-Raynolds Company and as ERL resins by the Bakelite Company. The data given below for epoxy resins is representative of resins used herein. It will be noted that the epoxy equivalents range from about 175 to about 300. It has been found that resins having epoxy equivalents outside this range are not suitable. Furthermore a combination of epoxy resins must be used as set forth herein, one of the resin components being Epon 1310 or other material which has a comparable epoxy equivalent and softening point.

Table I

| Epoxy Resin | Epoxide Equivalent | M.P., °C. |
| --- | --- | --- |
| Epon 828 | 192 | Liquid |
| Epon 834 | 225–290 | 20–28 |
| Epon 1310 | 220–225 | 77 |
| Araldite 6005 | 188–190 | Liquid |
| Araldite 6010 | 192 | Liquid |
| Araldite 6020 | 200–205 | Liquid |
| ERL 2774 | 175–200 | Liquid |
| Epi Rez 510 | 175–200 | Liquid |

Very few of the curing agents normally used with epoxy resins have been found to be suitable in connection with the present invention inasmuch as they generally produce a cured epoxy resin which, under high temperature conditions of the order of about 150° C., produce excessive volatile material and thus cause delamination, and other defects which this invention seeks to eliminate. Other curing agents have been also found variously to be incompatible with the rest of the system, hard to mix, toxic, to have undesirable side reactions and otherwise difficult to handle or use. Among the curing agents which have been found useful in connection with this invention are those described in application Serial No. 691,173, October 21, 1957, assigned to the same assignee as this invention. According to this application, there are described curing agents comprising a mixture of an organic nitrogen-containing base having at least one nitrogen atom per molecule and no more than one hydrogen atom on each nitrogen atom, said base containing no other reactive groups, i.e., groups which are reactive with the ethoxyline resin or the alkyl titanate, and an organic titanium ester. Examples of reactive groups include hydroxyl or carboxyl groups as well as multiple hydrogenous atoms on nitrogen atoms. Representative examples of nitrogen-containing bases as set forth in the above application which is included herein by reference are amines such as piperidine, pyridine, dibutylamine, triethanolamine, tributylamine, morpholine, n-cocoa-morpholine, trimethylamine, diethylamine, dibutylamine, and derivatives of these amines. The titanates found useful are those of the general formula $Ti(OR)_4$, wherein R is a radical selected from the group consisting of the saturated and unsaturated aliphatic hydrocarbons, for example, methyl, ethyl, etc., and vinyl alkyl, etc., aralkyl, alkaryl, and cycloaliphatic radicals, among others.

Another type of curing agent found useful for the epoxy resins in connection with the present application are the boron-trifluoride-organic base complex materials. These materials are well known in the art and are conveniently prepared by adding to an ether solution of base amine as desired an ether solution of the boron-trifluoride-ether complex. They can also be prepared by simply bubbling fluoride solution or a gas through an ether solution. Preferably, alkyl ethers are used, such as methyl, ethyl, propyl, butyl, etc. or mixed alkyl ethers, as well as aryl ethers, esters, alkyl, alkaryl, and aralkyl ethers. Among the amines which can be used are methylamine, ethylamine, propylamine, butylamine, aniline, diethyl aniline, toluidene, chloro aniline, nitro aniline, and piperidine. Also useful are complexes prepared as above of boron trifluoride with materials such as phenol and etherate complexes. Other suitable ethers and base materials will occur to those skilled in the art. A $BF_3$-ethylamine complex material is commercially available from the Shell Chemical Company and is known as BF3–400. From about 1.5 to 6 percent by weight of this material, preferably from 2.5 to 3.5 percent based on the resin weight is used.

In preparing the strand insulation or the insulation 2 on the individual conductor bars 1, usual insulating techniques are used which are well known to those skilled in the art. Briefly the wire is coated with epoxy resin varnish containing a curing agent, asbestos fibers, or other suitable fibrous materials are applied thereto, and these fibers are in turn impregnated with the epoxy resin varnish. Any excess of epoxy resin is removed as by wipers, and the material is heated to expel all volatile material such as solvent, but not to the extent that any curing of the strand insulation takes place. Typical epoxy resin solutions which have been found useful for this strand insulation are those comprising by weight from 10 to 20 percent Epon 1310, 60 to 80 percent Araldite 6010, 0.2 to 10 percent tetrabutyltitanate, 0.1 to 6 percent dimethyl soya amine, and 5 to 15 percent methyl ethyl ketone. Epon 1310 is the polyglycidyl ether of 1,1',2,2'-tetrakis(hydroxyphenyl) ethane. A preferred epoxy resin solution for such use is one containing, by weight, 14 percent Epon 1310, 71.4 percent Araldite 6010, 4.3 percent tetrabutyl titanate, 1.5 percent dimethyl soya bean, and 8.8 percent methyl ethyl ketone. It will be realized, of course, that in place of the methyl ethyl ketone, any of the other well-known solvents for epoxy resins may be used, so long as they are comparable.

The vertical separators 3 are readily made by impregnating an asbestos glass cloth of the usual type with an epoxy resin solution as by dipping, brushing, or application through coating rollers, the finished material again being completely dried but with no polymerization taking place. Typical epoxy resin solutions for vertical separator treatment are those containing, by weight, from 35 to 65 percent Epon 1310, 10 to 20 percent Araldite 6010, 0.2 to 10 percent tetrabutyl titanate, 0.1 to 6 percent dimethyl soya bean, and 30 to 60 percent methyl ethyl ketone, while a specific preferred material is one containing, by weight, 41.7 percent Epon 1310, 13 percent Araldite 6010, 2.7 percent tetrabutyl titanate, 1.1 percent dimethyl soya bean, and 41.5 percent methyl ethyl ketone.

Whereas in D.-C. machines the entire conductor bar array is made up of conducting material or strands, in A.-C. machines it has been found desirable, as pointed out above, to transpose the strands by one means or another, for example, in the Roebel transposition herein described, there is accomplished a complete rotation of the respective strand positions throughout the conductor bar length. The voids or spaces produced in the vertical ends of the conductor bar array indicated at 4 in the drawing, which were formerly partially filled with a shellac or asphalt impregnated fibrous material, are, according to this invention, filled with a so-called filler putty which has as its base an epoxy resin. While the filler putty may be applied directly to the conductor bar, it has been found more convenient to place the putty on a rigid strip of a resinous material such as a polyester-glass or polyethylene terephthalate strip, and then in turn to place the resin strip on the vertical ends of the conductor bar with the putty adjacent the conductor bar, so that when a sacrifice tape is wound over the conductor bar-strip assembly and pressure applied, the putty flows uniformly into all the voids and spaces created by the transposition process. The bar with the sacrifice tape is treated under heat and pressure to cure the epoxy resin composition and firmly bind the conductors, vertical separators and putty together to make a unitary structure of the proper shape. Typically, the bar is heated for about 10 to 30 minutes at a temperature of about 135° C. to 140° C. at a pressure of from about 80 to 110 p.s.i., the curing cycle being of a time-temperature nature. It will be realized, of course, that the slot portion and end portions can be molded separately. If the end portions are molded separately, they are preferably painted with an epoxy resin composition comprising, by weight, from about 20 to 50 parts Epon 1310, 50 to 80 parts methyl ethyl ketone, and from 6 to 15 parts of diethylene triamine ethylene oxide and molded. Preferably the varnish, by weight, comprises 35 parts Epon 1310, 65 parts methyl ethyl ketone, and 9 parts diethylene triamine ethylene oxide. Other compositions will occur to those skilled in the art.

It has been found in actual practice that if the conductor bar arrays are treated as described above, there is little or no gassing or release of volatile materials therefrom at temperatures of up to about 150° C. This is as compared to the creation of voids or release of volatile materials at temperatures as low as 125° C. for conductor bar arrays containing asphalt strand insulation or polyester strand insulation, or, in fact, epoxy resin strand insulation containing acid anhydride curing agent. It has also been found that it is the resinous material heretofore used in the conductor bar insulation, such as the strand insulation, the resinous material in the transposition filler wedges, and the resinous material in the vertical separators, which has contributed most significantly to the void generation or delamination problem.

Any usual ground insulation may be applied to the base bar treated as described in this invention, including polyester materials, epoxy materials, other thermosetting or even thermoplastic materials. Exemplary of such ground insulation is that applied in accordance wtih Patent 2,707,204, cited above, which is included herein by reference. Thus, for example, a ground insulation consisting of mica paper and mica flake tape may have as a resin binder a composition prepared as follows. Typically, an acidic glyceryl adipate polyester was prepared by heating with stirring 438 parts (3 mols) adipic acid and 92.1 parts (1 mol) glycerine at 190° C. to 210° C. for about 2 hours. The acidic polyester obtained had an acid number of 390 and was mixed with an epoxy resin, specifically Epon 1000, and dissolved in acetone to form a 20 percent resin solid solution in which the acidic glyceryl adipate resin comprised about 20 percent by weight of the latter and the ethoxyline resin. Mica paper prepared in accordance with the previously mentioned Patent 2,549,880 was then coated with the solution three times and allowed to air dry about 2 hours between each coating. The resultant treated mica paper which had a resin solids content of about 33 percent volatile matter was then cut into a tape which was used to insulate an electrical winding portion by wrapping the base bar in half-lapped fashion. Thereafter, the wrapped stator bar containing about 17 half-lapped layers was protected by wrapping with a glass cloth sacrifice tape, placed in a pressure tank and evacuated at a temperature of 60° C. for six hours. Then, molten bitumen or asphalt material was injected under pressure into the tank so that the temperature and pressure in the tank were about 150° C. at 100 p.s.i. respectively. This treatment was continued for about six hours to produce intercondensation of the epoxy resin with the acidic glyceryl adipate resin, and to convert the resinous insulation to the substantially infusible and insoluble state. The treatment also molded and compressed the insulation around the stator bar into a compact mass. At the end of this time, the bar was removed from the asphalt bath, cooled and the adhering asphalt and sacrifice tape removed to give an insulated bar having excellent dielectric strength. The bar treated in this manner with the preferred inner bar insulation set forth above and rated at 18 kv. had a power factor spread at 1 to 20 kv., a temperature of 140° C. of 2 percent, whereas a bar treated according to prior practice with asphalt or other volatile producing materials in the conductor bar insulation itself had a power factor spread at 1 to 20 kv. and 140° C. of about 21 percent. The temperature at which bars treated according to the present invention generate sufficient volatile material to produce voids therein is raised by about 20 to 25° C. over those produced by prior art methods mentioned above. If the percent of delamination is defined as the increased thickness of the ground insulation upon exposure to heat, at 140° C. after 15 hours' exposure to such temperature, bars of the present invention had less than 2 percent thickness increase, whereas the ground insulation of bars treated by prior art methods had increased in thickness to the extent of about 9 percent at only 140° C.; a 2 percent increase in the ground insulation thickness of such prior art bars took place at a temperature of about 120° C. It will be seen that the kilovolt ampere or other comparable rating of electrodynamic machines having the insulation system described herein can be up-rated or, conversely, machines of the same rating can be made smaller and more compact. It is estimated that for A.-C. generators in the 80,000 to 120,000 kva. class, the present, essentially non-gassing insulation permits raising the rating about 12 percent.

By the present invention, there is provided an internal insulating system for conductor bars of electrodynamic machines which is essentially non-gassing and thermally stable at temperatures up to the order of 150° C. and provides improved bonding within the bars as well as to the external ground insulation at such temperatures. In conjunction with the usual ground insulation, with which it is compatible, our insulation system permits the construction of electrodynamic machinery which is more stable at elevated temperatures and thus can be up-rated or for the same rating made in more compact form.

While the invention has been described with particular reference to windings for electrodynamic machines, it will be realized that it applies as well to windings of other types, such as for relays, transformers, etc. where such invention might be applicable.

What we claim as new and desire to secure by Letters Patent of the United States is:

1. An internal insulation system for a conductor bar of an electrodynamic machine said insulation system comprising interconductor insulation, insulation for conductor tiers, and insulation for voids produced by transposition of said conductors said insulation comprising (1) a mixture of epoxy resins consisting of a complex epoxide resin containing epoxy groups and comprising a polyether derivative of a polyhydric organic compound selected from the class consisting of polyhydric alcohols and phenols having at least two phenolic hydroxy groups, said resin having an epoxy equivalent of from about 175 to 300, and the polyglycidyl ether of 1,1',2,2'-tetrakis(hydroxyphenyl)ethane (2) a curing agent for (1) comprising a material selected from the group consisting of (a) a $BF_3$-amine complex material and (b) a mixture of nitrogen containing base having at least one hydrogen atom per molecule and no more than one hydrogen atom on said nitrogen atom, said base containing no other reactive groups, and an alkyl titanate, said insulation material being essentially non-gassing at temperatures up to the order of 150° C.

2. An electrical winding comprising a plurality of conductors in juxtaposed relationship said conductors having an insulation system comprising internal conductor bar insulation, said insulation comprising material comprising (1) a mixture of epoxy resins consisting of a complex epoxide resin containing epoxy groups and comprising a polyether derivative of a polyhydric organic compound selected from the class consisting of polyhydric alcohols and phenols having at least two phenolic hydroxy groups, said resin having an epoxy equivalent of from about 175 to 300, and polyglycidyl ether of 1,1',2,2'-tetrakis(hydroxyphenyl) ethane (2) a curing agent for (1) comprising a material selected from the group consisting of (a) a $BF_3$-amine complex material and (b) a mixture of nitrogen containing base having at least one hydrogen atom per molecule and no more than one hydrogen atom on said nitrogen atom, said base containing no other reactive groups, and an alkyl titanate, and ground insulation over said winding said insulation system being essentially non-gassing at temperatures up to the order of 150° C.

References Cited in the file of this patent

UNITED STATES PATENTS

| | | |
|---|---|---|
| 2,656,290 | Berberich et al. | Oct. 20, 1953 |
| 2,707,204 | Richardson et al. | Apr. 26, 1955 |

OTHER REFERENCES

"Epoxy Resins," by Lee and Neville, July 31, 1957, Mc-Graw-Hill Co. Inc., p. 111.

UNITED STATES PATENT OFFICE
CERTIFICATION OF CORRECTION

Patent No. 2,962,613            November 29, 1960

Richard T. Maher et al.

It is hereby certified that error appears in the above numbered patent requiring correction and that the said Letters Patent should read as corrected below.

Column 7, line 8, and column 8, line 6, for "hydrogen", each occurrence, read -- nitrogen --.

Signed and sealed this 11th day of July 1961.

(SEAL)
Attest:

ERNEST W. SWIDER            DAVID L. LADD
Attesting Officer            Commissioner of Patents